Figure 1:
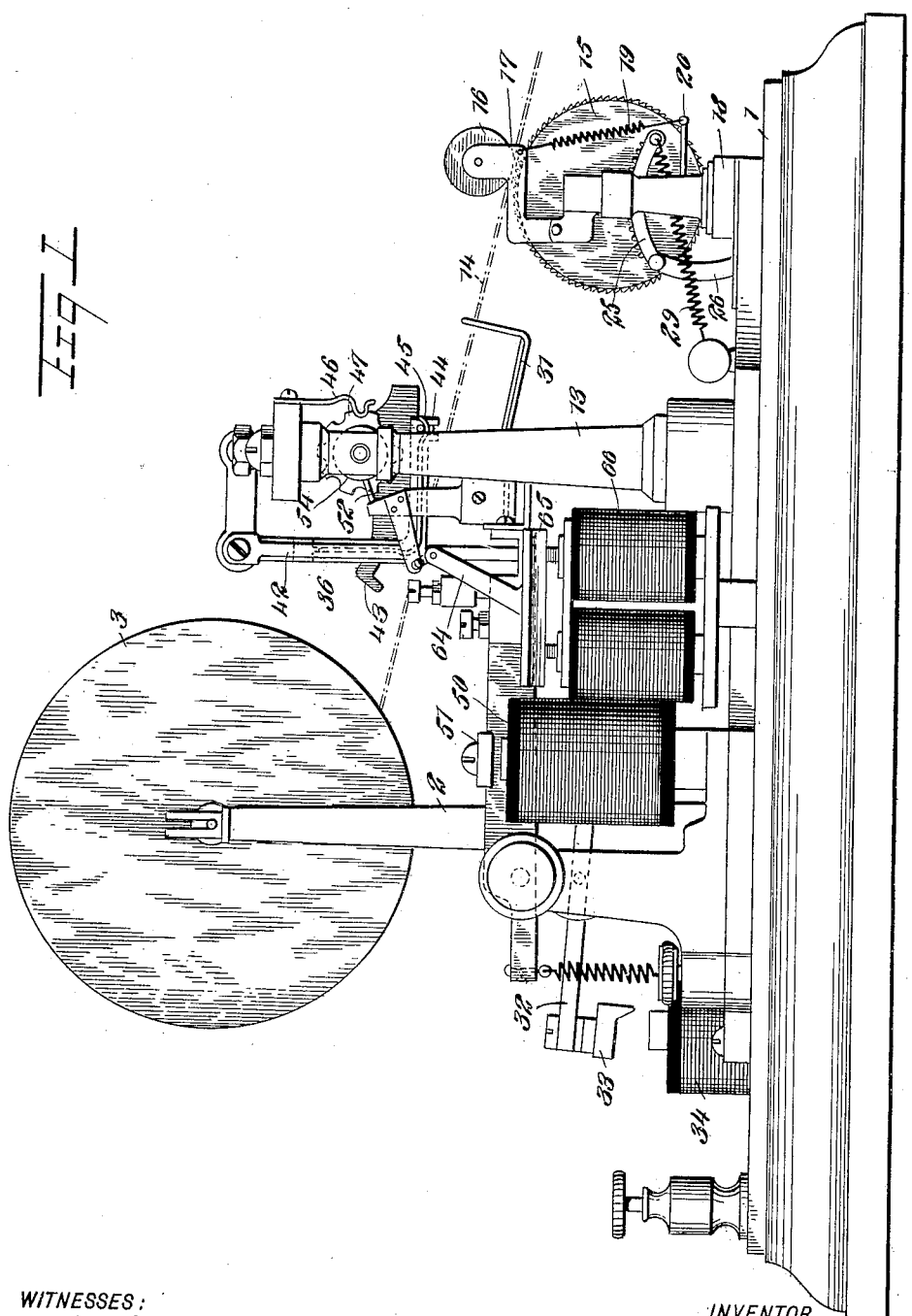

No. 701,757. Patented June 3, 1902.
E. McGARVEY.
WEIGHT AND PRESSURE RECORDING APPARATUS.
(Application filed May 25, 1901.)
(No Model.) 6 Sheets—Sheet 1.

WITNESSES:
H. Walker
C. R. Ferguson

INVENTOR
Edward McGarvey
BY
Munn
ATTORNEYS

No. 701,757. Patented June 3, 1902.
E. McGARVEY.
WEIGHT AND PRESSURE RECORDING APPARATUS.
(Application filed May 25, 1901.)
(No Model.) 6 Sheets—Sheet 2.

WITNESSES:
H. Walker
C. R. Ferguson

INVENTOR
Edward McGarvey
BY
ATTORNEYS

No. 701,757. Patented June 3, 1902.
E. McGARVEY.
WEIGHT AND PRESSURE RECORDING APPARATUS.
(Application filed May 25, 1901.)
(No Model.) 6 Sheets—Sheet 3.

WITNESSES:
H. Walker
C. R. Ferguson

INVENTOR
Edward McGarvey
BY
ATTORNEYS

No. 701,757. Patented June 3, 1902.
E. McGARVEY.
WEIGHT AND PRESSURE RECORDING APPARATUS.
(Application filed May 25, 1901.)
(No Model.) 6 Sheets—Sheet 4.

WITNESSES:
INVENTOR
Edward McGarvey
BY
ATTORNEYS

No. 701,757. Patented June 3, 1902.
E. McGARVEY.
WEIGHT AND PRESSURE RECORDING APPARATUS.
(Application filed May 25, 1901.)
(No Model.) 6 Sheets—Sheet 5.
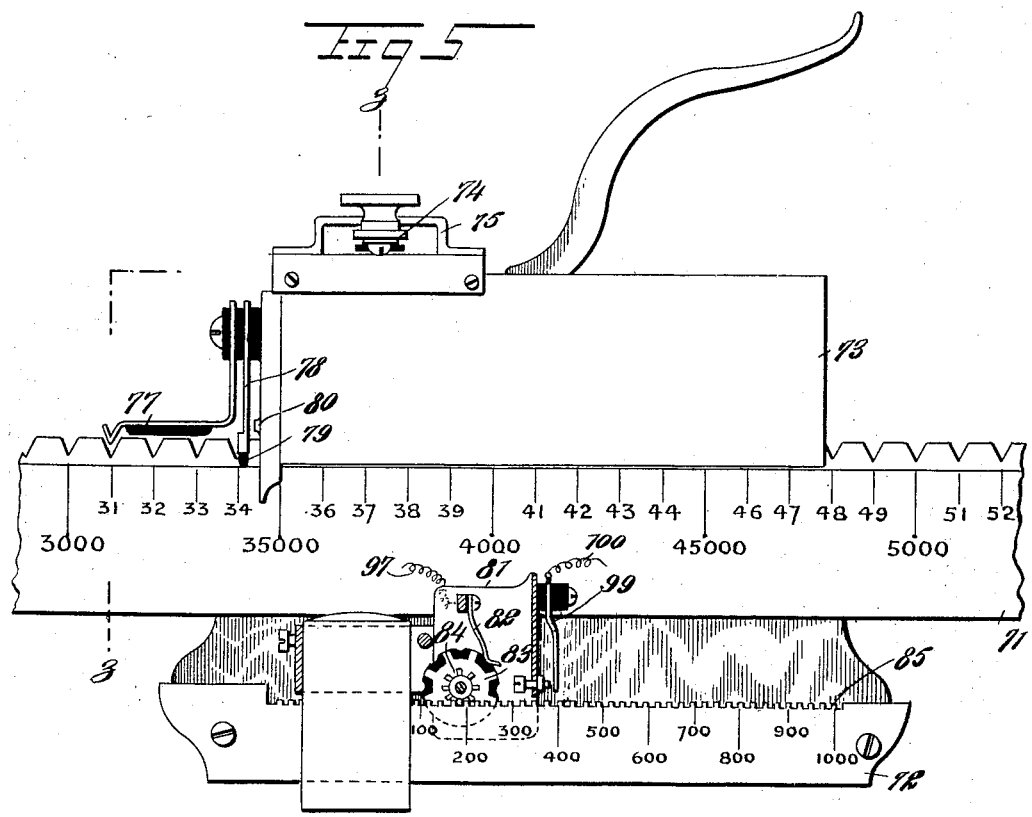
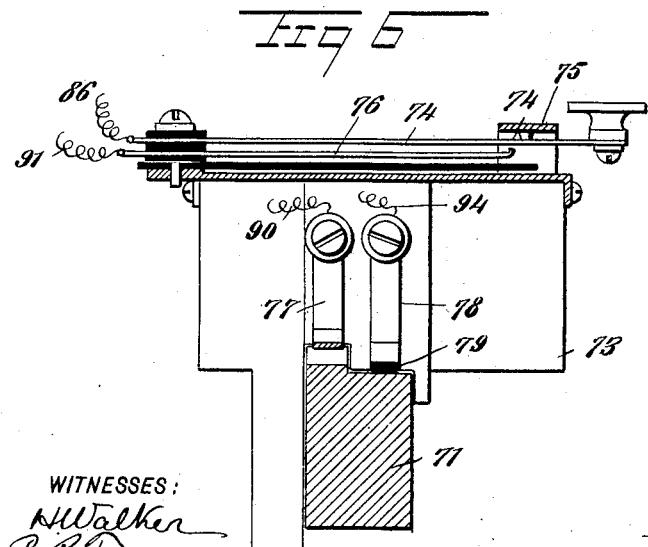
WITNESSES:
N. Walker
C. R. Ferguson
INVENTOR
Edward McGarvey
BY
Munn
ATTORNEYS
THE NORRIS PETERS CO., PHOTO-LITHO., WASHINGTON, D. C.

No. 701,757.  
Patented June 3, 1902.
E. McGARVEY.
WEIGHT AND PRESSURE RECORDING APPARATUS.
(Application filed May 25, 1901.)
(No Model.)  
6 Sheets—Sheet 6.
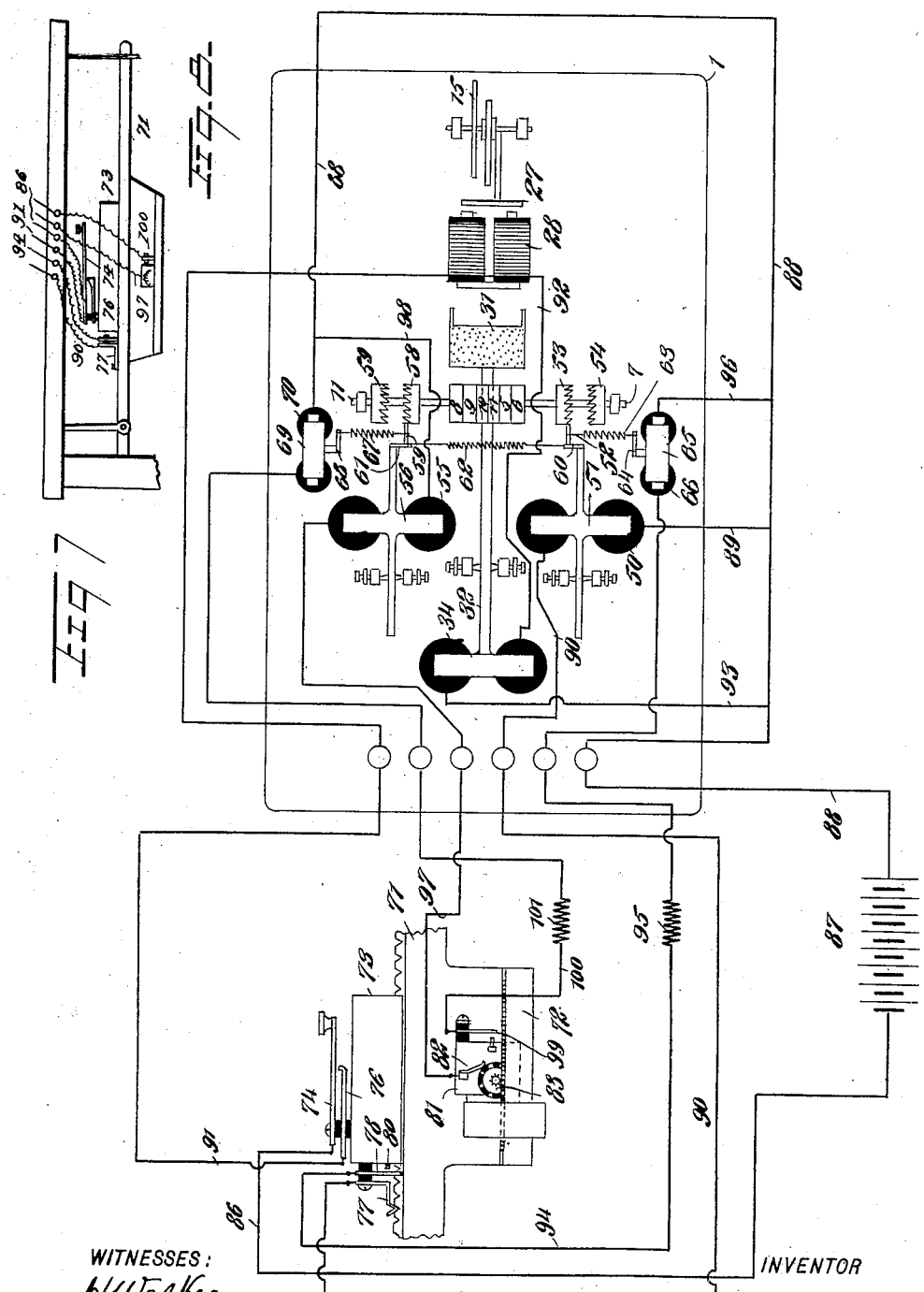
WITNESSES:  
INVENTOR  
Edward McGarvey  
BY  
ATTORNEYS

United States Patent Office.

EDWARD McGARVEY, OF BELLEFONTE, PENNSYLVANIA, ASSIGNOR TO JOHN J. WALSH, HUGH S. TAYLOR, SIDNEY KRUMRINE, GUY C. LINN, EDWARD McGARVEY, JAMES P. AIKENS, ROBERT B. TAYLOR, AND ELLIS L. ORVIS, OF BELLEFONTE, PENNSYLVANIA.

WEIGHT AND PRESSURE RECORDING APPARATUS.

SPECIFICATION forming part of Letters Patent No. 701,757, dated June 3, 1902.

Application filed May 25, 1901. Serial No. 61,883. (No model.)

*To all whom it may concern:*

Be it known that I, EDWARD McGARVEY, a citizen of the United States, and a resident of Bellefonte, in the county of Center and State of Pennsylvania, have invented a new and Improved Weight and Pressure Recording Apparatus, of which the following is a full, clear, and exact description.

It is a recognized desire by scale manufacturers and users to have an attachment by which the weight as indicated on the scale-beam may be quickly and accurately recorded on a suitable band or card in order to avoid mistakes liable to be made by the weighman in reading the weight from the beam and that the weighman may have a correct record automatically made to verify his weights in case of dispute.

The object of my present invention is to provide a simple device that may be located at any desired distance from the scale by which weights may be recorded on an automatically-feeding strip of paper, thus obviating the placing of a card manually in record-receiving position, and therefore causing a great saving of time.

Further objects will appear in the general description.

I will describe a weight and pressure recording device embodying my invention and then point out the novel features in the appended claims.

Reference is to be had to the accompanying drawings, forming a part of this specification, in which similar characters of reference indicate corresponding parts in all the figures.

Figure 2:
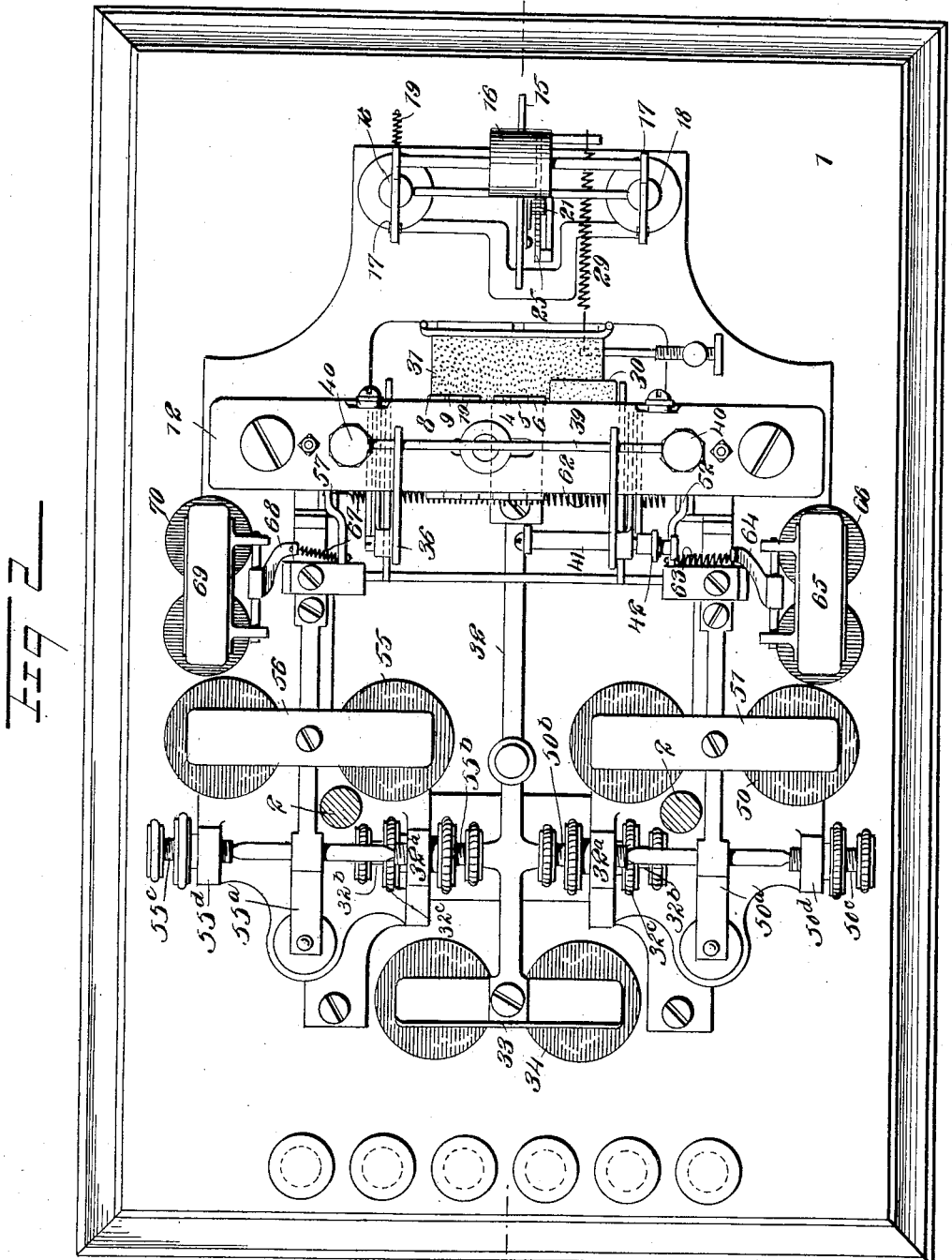
Figure 3:
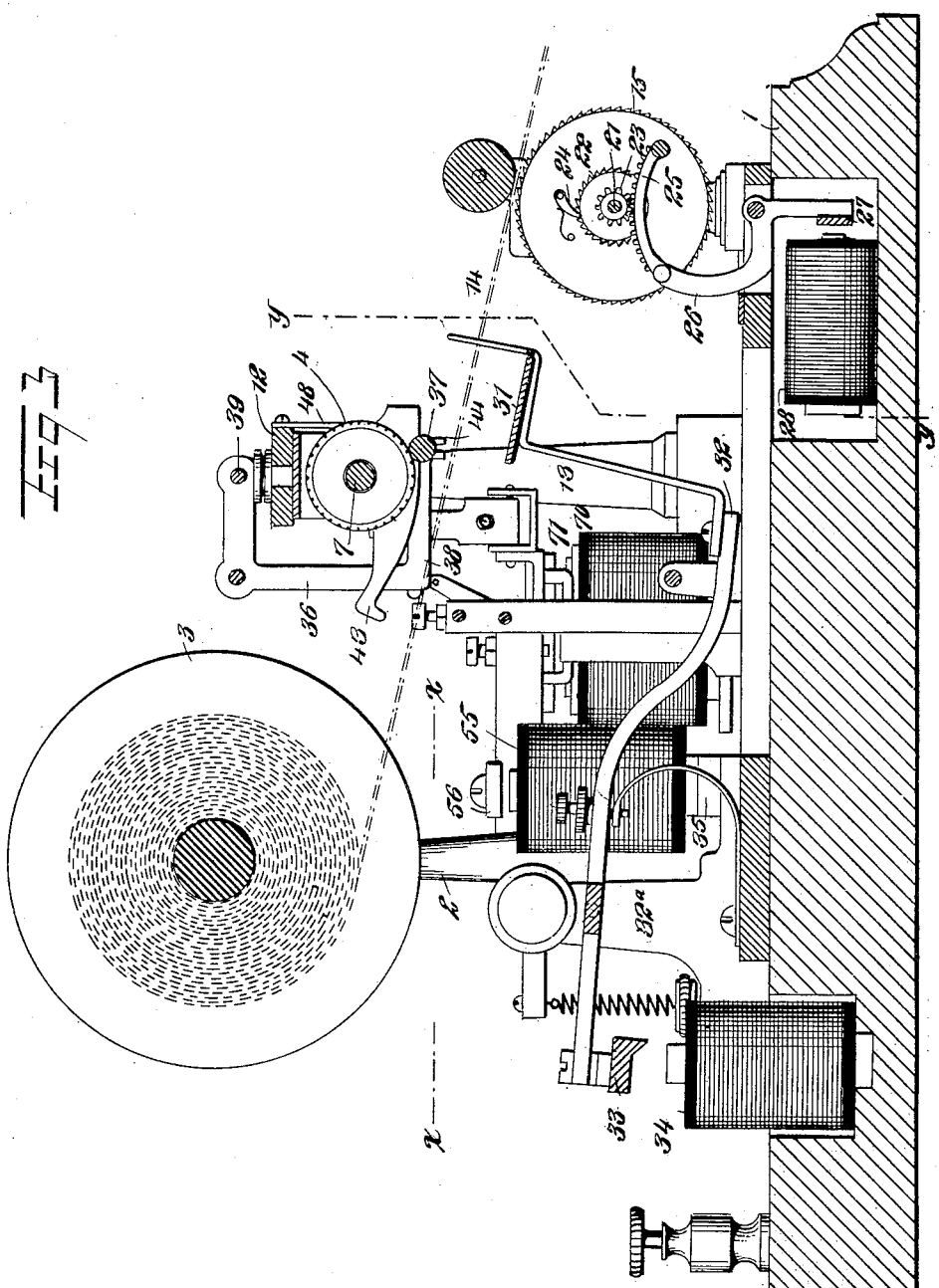
Figure 4:
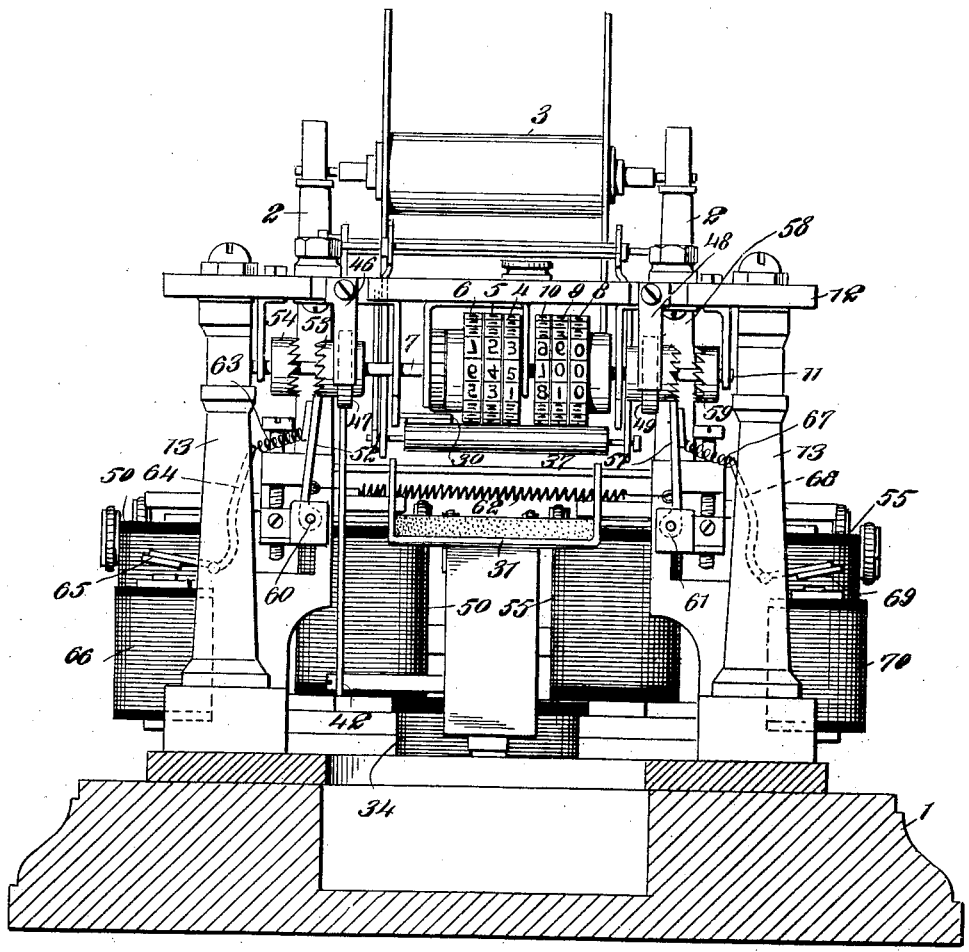

Figure 1 is a side elevation of a recording apparatus embodying my invention. Fig. 2 is a top plan view thereof, partly in section, on the line $x\ x$ of Fig. 3. Fig. 3 is a section on the line $w\ w$ of Fig. 2. Fig. 4 is a section on the line $y\ y$ of Fig. 3. Fig. 5 indicates upper and lower scale-beams with the circuit-closers thereon. Fig. 6 is a section on the line $z\ z$ of Fig. 5. Fig. 7 is a diagrammatic view illustrating the circuits, and Fig. 8 is a detail view showing the flexible wires connected to the poise.

The recording apparatus comprises a base 1, on uprights 2 of which a reel 3 is mounted and from which a long strip of record-paper is to be drawn.

The printing devices consist of two sets of peripherally-numbered disks, the two sets being operated one independently of the other, one set being designed for coaction with circuit-closing devices carried by the upper scale-beam, whereby weights to a certain amount may be printed, and the other series being designed for connection with circuit-closing devices on the lower scale-beam to record the higher weights. The first set comprises disks 4, 5, and 6, mounted on a shaft 7, the units-disk 4 being rigidly attached to the shaft, while the tens and hundreds disks are loosely mounted on the shaft and operated from the units-disk in the usual manner. The other set comprises the numbered disks 8, 9, and 10, the units-disk 8 being rigidly attached to a shaft 11, while the tens and hundreds disks are mounted loosely on the shaft and operated from the units-disk. The shafts 7 and 11 are supported from a cross-bar 12, mounted on posts 13, extended upward from the base. The paper 14 passes from the reel 3 underneath the printing-disks, and a step-by-step motion is imparted to the strip by means of a wheel 15, having teeth on its periphery to engage slightly into the paper, and the paper is held yieldingly against the teeth by means of a roller 16, bearing upon the upper surface of the strip. This roller 16 has its shaft-bearings in arms 17, mounted to swing on posts 18, and it is held downward yieldingly by means of a spring 19, engaging at one end with one of the arms 17 and at the other end with a fixed portion of the machine, here shown as a finger 20, extended outward from one of the posts or uprights 18. The feed-wheel 15 is loosely mounted on a shaft 21, having bearings in the posts or uprights 18, and connected to this shaft is a ratchet-wheel 22 and a pinion 23. The ratchet-wheel 22 is engaged by a spring-pressed pawl 24, mounted on the feed-wheel, and the pinion 23 is engaged by a segmental rack 25, pivotally connected to an angle-lever 26, on which is mounted an armature 27, coacting with an electromagnet 28. In the operation of this feeding device when the electromagnet 28 is energized it will attract the armature 27, rocking the lever 26, and consequently moving the rack 25, which will cause a rotation of the ratchet-wheel 22 for imparting motion to the feed-wheel 15. When the electromagnet 28 is to be deënergized, a spring 29, connected at one end to the end of the rack 25 and at the other end to a fixed portion of the machine, will draw said rack rearward, and as at this time the pawl 24 engages with a tooth of the ratchet-wheel the feed-wheel 15 will be rotated a short distance to feed the paper strip.

Arranged adjacent to the printing-disks is a plate 30, upon which type are to be placed for printing any desired matter—such, for instance, as the words "Net," "Gross," and "No." The printing-surfaces of these letters on the plate 30 will of course be in plane with the printing characters on the disks when such characters are in printing position. The paper strip is pressed up against the type by means of a platen 31, carried by an armature-lever 32, which has connected to it an armature 33, coacting with an electromagnet 34. This armature-lever 32 is fulcrumed on screws $32^b$ having bearings in posts $32^a$, and on the screws are lock-nuts $32^c$, and a curved spring 35 serves to compensate the change in magnetism of the armature 33.

Mounted to swing rearward of the printing devices is a frame 36, which carries an inking-roller 37 at the forward ends of the lower arms 38 of said frame, which are designed to move underneath the printing devices. The upper arms of this swinging frame and which are parallel with the lower arms 38 are connected to a shaft 39, having bearings in studs 40 on the cross-bar 12. From an arm 41, extended outward from the armature-lever 32, a link 42 extends to a connection with the upper portion of the roller-carrying frame 36. Therefore when the armature 33 is attracted by the electromagnet 34 the platen 31 will be swung upward to press the paper against the type; but before it reaches such position the frame 36 will be rocked to carry the inking-roller 37 over the type and ink the same, and the frame will be prevented from moving too far rearward by engaging with stop-arms 43. The journals of the inking-roller are seated in the forked ends 44 of the lower members 38 of the swinging frame and are held removably in such position by means of spring-fingers 45. Therefore this roller may be readily removed when it is desired to supply it with ink.

The first set of printing-disks are prevented from rotating too far by means of a spring-dog 46, engaging with a notched wheel 47 on the shaft 7, while a similar dog 48 engages with a notched wheel 49 on the shaft 11 to hold the shaft 11 in its adjusted position. The first set of printing-disks are operated by an electromagnet 50, coacting with an armature 51 on the lever $50^a$ of which is carried a finger 52 for engaging with the crown ratchet-teeth of either one of the wheels 53 or 54, mounted on the shaft 7. The ratchet-teeth of these wheels are in reverse order, so that when the finger 52 engages with a tooth of the inner wheel 53 the printing-disks will be rotated in a forward direction; but when the said finger coacts with the ratchet-wheel 54 the disks will be moved backward or in reverse order, as will hereinafter appear. The wheels of the other series are operated by an electromagnet 55, coacting with an armature 56, to the lever $55^a$ of which is attached a finger 57 for coacting with either one of the crown-toothed ratchet-wheels 58 or 59 on the shaft 11. The said teeth of the two ratchet-wheels are in reverse order, as described in reference to the wheels 53 and 54, and for the same purpose, as will more fully appear hereinafter. The lever $50^a$ has its shaft-bearings in screws $50^b$ $50^c$, supported, respectively, by a post $32^a$ and a post $50^d$, and the lever $55^a$ has its shaft-bearings in screws $55^b$ and $55^c$, supported in a post $32^a$ and a post $55^b$, and suitable lock-nuts are placed on these screws. The arm 60, on which the finger 52 is mounted, is pivotally connected to the lever of the armature 51, and the arm 61, to which the finger 57 is connected, is pivoted to the lever of the armature 56, and the two fingers 52 and 57 are connected by a spring 62, which has a tendency to draw the fingers toward each other, but to hold them normally in operative position with relation to the inner ratchet-wheels 53 and 58. The finger 52 has a spring-yielding connection 63 with an arm 64, which is connected to and extends upward from an armature 65, coacting with what may be termed a "reversing-electromagnet" 66. The finger 57 of the arm 61 has a spring-yielding connection 67 with an upwardly-extended arm 68 on the armature 69 coacting with a reversing-electromagnet 70.

I will now describe the circuit-closing devices designed to be attached to the scale-beams and the electrical connections. It will be understood that especially in railway-scales the upper beam is provided with notches. This upper beam is indicated at 71, and the lower beam 72 is attached thereto. Mounted to move on the upper beam 71 to represent weights up to a certain amount is a poise 73. Mounted on this poise 73 is a circuit-closer comprising a finger-pressed arm 74, which is in normal electrical connection with the poise 73 through a loop 75, and this arm 74 is designed to engage with a spring contact-finger 76, also carried by the poise and insulated therefrom. Carried by one end of the poise 73, but insulated therefrom, is an angular spring-yielding contact-finger 77, having a V-shaped end adapted to pass freely into any one of the notches in the top of the beam, but to engage with the walls thereof when the poise is moved along to close a circuit. Also carried on the poise, but insulated therefrom, is a spring-yielding contact-finger 78, the lower end of which is provided with a rubber cushion or tip 79, which bears upon the upper plain edge of the beam. This rubber tip is designed to produce a sufficient friction between the parts, so that when the poise is moved reaward the spring-contact 78 will move into electrical connection with the poise. I have here shown a contact-lug 80 on the poise adapted to be engaged by said spring-finger 78. Mounted to move along the lower beam 72 is a poise 81, which carries a contact-brush 82, engaging with the periphery of a wheel 83, which has its periphery insulated at intervals, and at intervals contact-points are arranged for engaging with the brush 82. On the shaft of this controlling-wheel 83 is a pinion 84, meshing with teeth 85, formed on the upper edge of the lower beam 72. From the contact-spring 74 a wire 86 leads to one pole of a source of electricity, (here shown as a battery 87,) and from the other pole of this battery a wire 88 leads and has connection through a shunt 89 with the electromagnet 50, from which a wire 90 leads to a connection with the spring-finger 77. From the contact-finger 76 a wire 91 leads to the feed-actuating electromagnet 28, and from this electromagnet 28 a wire 92 leads to the electromagnet 34, from which a wire 93 leads to the wire 88, thence through the battery 87 and the wire 86 to the key or spring-arm 74. From the contact-finger 78 a wire 94, provided with a resistance 95, this being a shunt-wire, leads to one pole of the electromagnet 66, while from the other pole a wire 96 leads to the wire 88, thence through the battery 87, the wire 86 to the poise, and back to the spring-finger 78 when said spring-finger is in contact with the poise. From the contact-brush 82 a wire 97 leads to one pole of the electromagnet 55, and from the other pole of this electromagnet a wire 98 leads to a connection with the main wire 88, thence through the battery 87, the wire 86, the poise 73, the two beams, and the poise 81 to the controlling-wheel 83. Carried by the poise 81, but insulated therefrom and adapted to be pressed into engagement therewith, is a spring-finger 99, from which a wire 100, which is a shunt-wire, and therefore provided with a resistance 101, leads to one pole of the electromagnet 70, while with the other pole the wire 88 connects. Therefore when the finger 99 is moved in contact with the poise the circuit will be closed through said finger 99, the wire 100, the electromagnet 70, the wire 88, the battery 87, the wire 86, and thence through the poises and beams back to the contact-finger 99 when in closed position. As shown in Fig. 8, the poises are electrically connected by very light flexible wires or cords to a block of binding-posts arranged at a point about equal distance from the two ends of the graduation, and the beam being once balanced with the wires no practical error will be caused by the movement of the wires.

The operation is as follows: When the weight is on the scale, the poise on the upper beam is to be moved along, and during this movement the circuit will be alternately closed and opened by the contact 77 coming in engagement with the beam. When the circuit is thus closed, the current will pass through the electromagnet 50, which by attracting its armature 51 will cause a step-by-step motion of the printing-wheels of the first series. Should the scale come to a balance by the poise on the upper beam, connection is to be made between the parts 74 and 76, which will cause a one-step movement of the feeding device and also actuate the inking-roller and the platen in the manner before described. Should the poise on the upper beam be moved too far forward, it will of course make it necessary to move it back. The spring-finger 78 will be bent into engagement with the lug 80 on the poise 73, and therefore the circuit will be closed through the electromagnet 66, which by operating its armature 65 will draw the finger 52 into operative connection with the outer ratchet-wheel 54, and the electromagnet 50 will operate to rotate the numbered or printing disks in reverse direction. Should the weight on the scale be too great to be weighed by the poise on the upper beam, the poise on the lower beam is to be moved along, and through the agency of the interrupted wheel 83 the circuit will be alternately closed and opened through the electromagnet 55, which will operate the higher series of printing-wheels. Should the poise on the lower beam be moved too far forward, the weigher is to place his finger against the spring-contact 99, so that in pushing the poise rearward the said finger will come in electrical engagement therewith, thus closing the circuit through the reversing-electromagnet 50, drawing the finger 57 into operative engagement with the ratchet-wheel 59 to reverse the movement of the printing-wheels, and to close the feeding and platen operating electromagnets the key or arm 74 is to be engaged with the finger 76, as before described. It will be seen by this operation that the weight represented by the scale-beam will be accurately recorded by the instrument.

Having thus described my invention, I claim as new and desire to secure by Letters Patent—

1. In a weight and pressure recording apparatus, a printing device, electrically-operated means for moving an impression-receiving strip relatively to the printing device, and a circuit-controller for said electrically-operated means, carried by and movable on a scale-beam, substantially as specified.

2. In a recording device, printing devices, electrically-operated means for imparting forward motion to the printing devices, electrically-operated means for imparting reversing motion to the printing devices, and a circuit-controller for said electrically-operated devices, carried by a scale-beam, substantially as specified.

3. In a weight and pressure recording apparatus, printing devices, a reel for supporting a strip to be printed upon, electrically-operated means for imparting reverse motion to the printing devices, electrically-actuated means for moving said strip, a platen for pressing the strip against the printing devices, and means carried by a scale-beam and movable thereon for controlling the electrically-operated devices, substantially as specified.

4. In a weight and pressure recording apparatus, printing-wheels, electrically-operated devices for moving said printing-wheels in opposite directions, an electrically-operated feeding device for a strip of material to be printed upon, an electrically-operated platen for pressing the strip against the printing-wheels, an inking-roller, and means carried by and movable along a scale-beam for controlling the electric circuits, substantially as specified.

5. A weight and pressure recording apparatus, two series of rotary printing devices, electric motors for operating said printing devices, upper and lower scale-beams, and devices carried by said scale-beams for controlling respectively the motors for the printing devices, substantially as specified.

6. In a weight and pressure recording apparatus, a series of printing-wheels, a swinging frame, an inking-roller carried by said frame, ratchet-wheels arranged on the shaft of the printing-wheels, the teeth of said ratchet-wheels being reversed in relation, a pawl for engaging with either one of said ratchet-wheels, an electromagnet for operating said pawl, an electromagnet for moving the pawl from one of said ratchet-wheels to the other, and means carried by a scale-beam for controlling the circuits through said electromagnets, substantially as specified.

7. In a weight and pressure recording apparatus, a series of printing-wheels, a shaft on which said wheels are mounted, ratchet-wheels on said shaft, the teeth of the two wheels being in reverse order, a finger for engaging with the teeth of either one of the ratchet-wheels, an armature carrying said finger, an electromagnet coacting with the armature, an electromagnet, the armature of which has a spring-yielding connection with said finger, the said last-named electromagnet being a reversing-magnet, a source of electricity in which the two magnets are arranged, and means carried by and moving along a scale-beam for controlling the circuit through the magnets, substantially as specified.

8. A scale-beam having notches formed in its upper edge, a poise movable along said scale-beam, a contact-finger carried by the poise and adapted to make and break electrical connections when passed along the notched portion of the beam, and a recording device in the electric circuit controlled by said movable poise, substantially as specified.

9. Upper and lower scale-beams, two series of printing-wheels, electric motors for operating said wheels, one series independently of the other, electric motors for causing the reverse movements of the wheels, one series independently of the other, a poise movable along the upper beam and adapted to control the current through one of the first-named electric motors and its coacting reversing-motor, and a poise movable along the other beam for controlling the current through the other two electric motors, substantially as specified.

10. A scale-beam, a poise movable along the same, a spring-yielding contact-point carried by said poise but insulated therefrom and adapted to be pressed into electrical connection with the poise, a series of printing-wheels, a reversing-electromagnet for the printing-wheels, the said electromagnet being in connection with the spring-contact carried by the poise and also in electrical connection with the poise, and means electrically operated and controlled by movements of said poise for imparting a forward movement to the printing-wheels, substantially as specified.

11. A scale-beam, a poise movable along the same, a wheel carried by said poise and having alternating contact-points and insulating-points in its periphery, a brush engaging with said wheel, a driving connection between said wheel and the beam, a series of printing-wheels, an electromagnet for imparting motion to said wheels, and a source of electricity in which the electromagnet and the brush and poise are arranged, substantially as specified.

12. A scale-beam, a series of rotary printing devices, an electric motor for operating said devices, a source of electricity in which said motor is located, a platen, a motor for operating said platen, the said motor being arranged in the source of electricity, a poise on the scale-beam, and circuit-closing devices carried by said poise, the said circuit-closing devices being in the source of electricity, substantially as specified.

In testimony whereof I have signed my name to this specification in the presence of two subscribing witnesses.

EDWARD McGARVEY.

Witnesses:
HARRY KELLER,
G. W. SCHREFFLER.